US012533753B2

(12) United States Patent
Kataoka et al.

(10) Patent No.: US 12,533,753 B2
(45) Date of Patent: Jan. 27, 2026

(54) MANUFACTURING-LOG MONITORING DEVICE, MANUFACTURED-OBJECT PRODUCTION SYSTEM, AND MANUFACTURING-LOG MONITORING METHOD

(71) Applicant: KOBE STEEL, LTD., Hyogo (JP)

(72) Inventors: Yasuto Kataoka, Kobe (JP); Eiichi Tamura, Kobe (JP); Akinori Yoshikawa, Kobe (JP); Shuo Huang, Kobe (JP); Shinji Sato, Kobe (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 363 days.

(21) Appl. No.: 18/262,228

(22) PCT Filed: Jan. 7, 2022

(86) PCT No.: PCT/JP2022/000397
§ 371 (c)(1),
(2) Date: Jul. 20, 2023

(87) PCT Pub. No.: WO2022/163328
PCT Pub. Date: Aug. 4, 2022

(65) Prior Publication Data
US 2024/0091885 A1 Mar. 21, 2024

(30) Foreign Application Priority Data
Jan. 29, 2021 (JP) .................................. 2021-013390

(51) Int. Cl.
*B23K 31/12* (2006.01)
*B22F 12/90* (2021.01)
(Continued)

(52) U.S. Cl.
CPC ............ *B23K 31/125* (2013.01); *B22F 12/90* (2021.01); *B23K 9/04* (2013.01); *B23K 9/095* (2013.01);
(Continued)

(58) Field of Classification Search
CPC ........................... B23K 31/125; G01N 33/207
See application file for complete search history.

(56) References Cited

U.S. PATENT DOCUMENTS

2020/0324356 A1* 10/2020 Yamasaki .............. B23K 9/126

FOREIGN PATENT DOCUMENTS

JP 2008-110388 A 5/2008
JP 2008-212944 A 9/2008

* cited by examiner

*Primary Examiner* — Erika J. Villaluna
(74) *Attorney, Agent, or Firm* — Studebaker Brackett PLLC

(57) ABSTRACT

A shape sensor is provided for acquiring a shape profile along an extension direction of an existing weld bead, and a control unit includes a welding information acquisition unit for acquiring welding information during formation of an adjacent weld bead when forming the adjacent weld bead at a position adjacent to the existing weld bead, and a defect candidate extraction unit for determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

11 Claims, 7 Drawing Sheets

(51) Int. Cl.
*B23K 9/04* (2006.01)
*B23K 9/095* (2006.01)
*B33Y 30/00* (2015.01)
*B33Y 50/02* (2015.01)
*G01N 33/2045* (2019.01)
*G01N 33/207* (2019.01)

(52) U.S. Cl.
CPC ............... *B33Y 30/00* (2014.12); *B33Y 50/02* (2014.12); *G01N 33/2045* (2019.01); *G01N 33/207* (2019.01)

MANUFACTURING-LOG MONITORING DEVICE, MANUFACTURED-OBJECT PRODUCTION SYSTEM, AND MANUFACTURING-LOG MONITORING METHOD

TECHNICAL FIELD

The present invention relates to an additive-manufacturing process monitoring device, an additively manufactured object manufacturing system, and an additive-manufacturing process monitoring method.

BACKGROUND ART

In Patent Literature 1, a technique is disclosed in which in welding work, a plurality of visual sensors are used to acquire a plurality of pieces of information on a projection length of a welding wire, a shape of a molten pool, and a behavior of a welder, and based on the pieces of information, a quality of the welding work is determined.

Patent Literature 2 discloses a technique for determining a quality of butt welding from a shape of a weld bead generated when butt welding metal plate materials by high energy density welding based on a cross-sectional shape acquired by a cross-section reading sensor that acquires a two-dimensional cross-sectional shape of the weld bead formed in a bevel.

CITATION LIST

Patent Literature

Patent Literature 1: JP2008-110388A
Patent Literature 2: JP2008-212944A

SUMMARY OF INVENTION

Technical Problem

By the way, in additive manufacturing that uses a heat source such as a laser beam or an arc to melt a metal powder or a metal wire to form a weld bead to build an additively manufactured object, by repeatedly laminating the weld beads, the additively manufactured object accumulates heat. In additive manufacturing, an existing weld bead is used as a base, instead of a well-prepared base with walls that support from both sides like a bevel, and a next weld bead is formed along the existing weld bead. Therefore, it is difficult to apply the techniques of Patent Literatures 1 and 2, which determine the quality of welding to a well-ordered base having walls that support from both sides like a bevel, to additive manufacturing.

Accordingly, an object of the present invention is to provide an additive-manufacturing process monitoring device, an additively manufactured object manufacturing system, and an additive-manufacturing process monitoring method capable of estimating, with high reliability, a defect in an additively manufactured object in which weld beads are repeatedly formed.

Solution to Problem

The present invention consists of the following configurations.

(1) An additive-manufacturing process monitoring device that estimates a defect from process information when building an additively manufactured object by forming a plurality of weld beads in which a filler material is melted and solidified by a torch, the additive-manufacturing process monitoring device including:

a shape profile acquisition unit for acquiring a shape profile along an extension direction of an existing weld bead;

a welding information acquisition unit for acquiring welding information during formation of an adjacent weld bead when forming the adjacent weld bead at a position adjacent to the existing weld bead; and a defect candidate extraction unit for determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

(2) An additively manufactured object manufacturing system that builds an additively manufactured object by forming a weld bead in which a filler material is melted and solidified by a torch while moving the torch, the additively manufactured object manufacturing system including:

the additive-manufacturing process monitoring device according to (1).

(3) An additive-manufacturing process monitoring method that estimates a defect from process information when building an additively manufactured object by forming a plurality of weld beads in which a filler material is melted and solidified by a torch, the additive-manufacturing process monitoring method including the steps of:

a) acquiring a shape profile along an extension direction of an existing weld bead;

b) acquiring welding information during formation of an adjacent weld bead when forming the adjacent weld bead at a position adjacent to the existing weld bead; and c) determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

Advantageous Effects of Invention

The present invention can reliably estimate a defect in an additively manufactured object in which weld beads are repeatedly formed.

BRIEF DESCRIPTION OF DRAWINGS

FIG. 2A is a schematic cross-sectional view illustrating a case where an existing weld bead has a small base angle, and FIG. 2B is a schematic cross-sectional view illustrating a case where the existing weld bead has a large base angle.

FIG. 7A is a perspective view of a state in which a bulging portion is formed, and FIG. 7B is a perspective view of a state in which a recessed portion is formed.

DESCRIPTION OF EMBODIMENTS

Hereinafter, an embodiment of the present invention will be described in detail with reference to the drawings.

Figure 1:
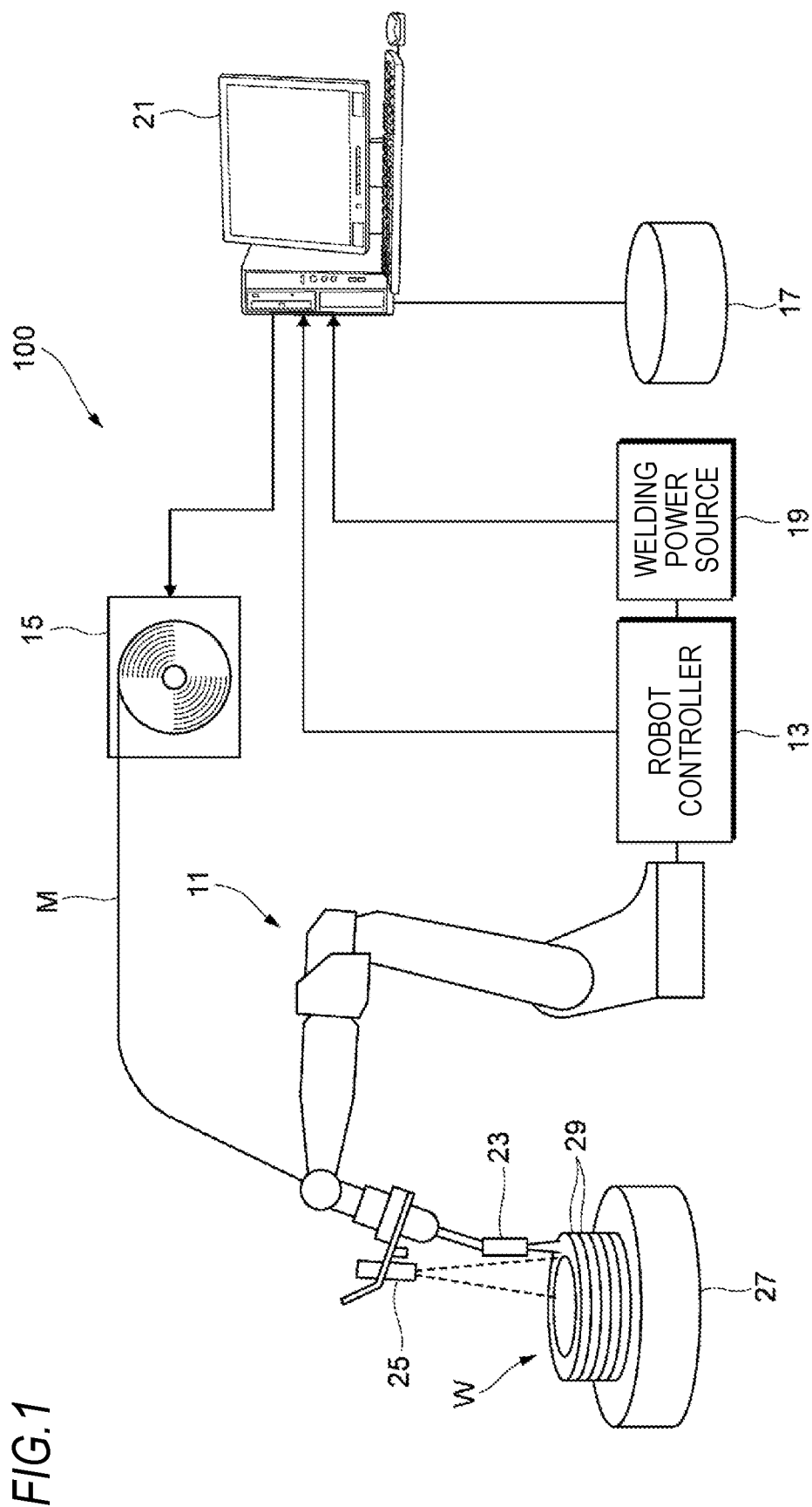
FIG. 1 is a schematic configuration diagram of a manufacturing system according to an embodiment of the present invention.

FIG. 1 is a schematic configuration diagram of an additively manufactured object manufacturing system 100 equipped with an additive-manufacturing process monitoring device of the present invention.

The additively manufactured object manufacturing system 100 of the configuration includes a welding robot 11, a robot controller 13, a filler material supply unit 15, a welding power source 19, and a control unit 21.

The welding robot 11 is an articulated robot, and a torch 23 is supported on a tip shaft. Position and posture of the torch 23 can be arbitrarily set three-dimensionally within a range of degrees of freedom of a robot arm. The torch 23 holds a filler material (welding wire) M continuously supplied from the filler material supply unit 15 in a state of protruding from a tip of the torch. The torch 23 and a shape sensor 25 are provided on the tip shaft of the welding robot 11.

The torch 23 has a shield nozzle (not illustrated), and shield gas is supplied to a welding portion from the shield nozzle. The arc welding method may be a consumable electrode type such as coated arc welding or carbon dioxide gas arc welding, or a non-consumable electrode type such as TIG welding or plasma arc welding, and is appropriately selected according to an additively manufactured object to be produced.

For example, in the case of the consumable electrode type, a contact tip is disposed inside a shield nozzle, and the contact tip holds the filler material M to which melting current is supplied. The torch 23 holds the filler material M and generates an arc from a tip of the filler material M in a shield gas atmosphere. The filler material M is fed to the torch 23 by a delivery mechanism (not illustrated) attached to a robot arm or the like. When the continuously fed filler material M is melted and solidified while moving the torch 23, a weld bead 29, which is a melted and solidified body of the filler material M, is formed on a base plate 27.

The base plate 27 is made of a metal plate such as a steel plate, and is basically larger than a bottom surface (lowermost layer surface) of an additively manufactured object W. The base plate 27 is not limited to a plate shape, and may be a base of other shapes such as a block or a rod.

A heat source for melting the filler material M is not limited to the arc described above. For example, a heat source using other methods such as a heating method using both an arc and a laser, a heating method using plasma, or a heating method using an electron beam or a laser may be employed. When heating with an electron beam or a laser, an amount of heating can be more finely controlled, and thus the state of the weld bead can be maintained more appropriately, and the quality of the additively manufactured object can be further improved.

Any commercially available welding wire can be used for the filler material M. For example, a wire specified by MAG welding and MIG welding solid wire (JIS Z 3312) for mild steel, high strength steel, and low temperature steel, arc welding flux-cored wire (JIS Z 3313) for mild steel, high-strength steel, and low-temperature steel, or the like can be used.

An active metal such as titanium can also be used as the filler material M. Here, it is necessary to create a shielding gas atmosphere in a welding portion to avoid oxidation and nitridation due to reaction with the atmosphere during welding.

The shape sensor 25 is disposed side by side with the torch 23 and is moved together with the torch 23. The shape sensor 25 is a sensor that measures a shape of a base portion when forming a weld bead 29. As the shape sensor 25, for example, a laser sensor that acquires reflected light rays of an irradiated laser light beam as height data is used. A three-dimensional shape measuring camera may be used as the shape sensor 25.

The robot controller 13 receives instructions from the control section 21 to drive each section of the welding robot 11 and controls an output of the welding power source 19 as necessary.

The control unit 21 is composed of a computer device including a CPU, a memory, a storage, and the like, and executes a drive program prepared in advance or a drive program created under desired conditions to drive each section of the welding robot 11 and the like. As a result, the torch 23 is moved according to the drive program, and a plurality of layers of weld beads 29 are laminated on the base plate 27 based on a created lamination plan, thereby forming the additively manufactured object W with a multi-layer structure. A database 17 is also connected to the control unit 21. In the database 17, process information including defect candidates extracted by the control unit 21, which will be described below, is stored and accumulated.

By the way, one or both of the width and height of the weld bead 29 formed when building the additively manufactured object W fluctuates because fluidity is greatly influenced depending on the material, conditions at the time of melting, and the like. Therefore, in the building of the additively manufactured object W, when the weld bead 29 is formed adjacent to the existing weld bead 29, there is a possibility that a defect occurs at an overlapping portion of adjacent weld beads 29.

Figure 2A:
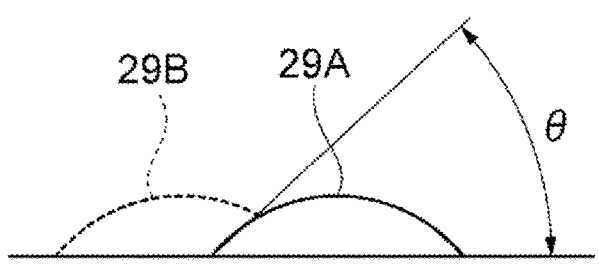
FIGS. 2A and 2B are diagrams illustrating weld beads formed by overlapping, where
Figure 2B:
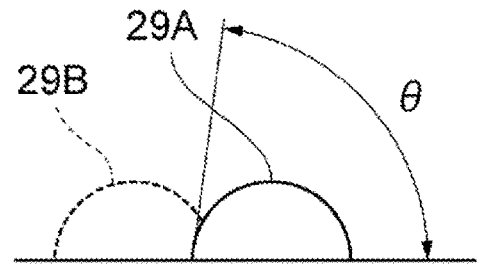

FIGS. 2A and 2B are diagram illustrating weld beads formed by overlapping, where FIG. 2A is a schematic cross-sectional view illustrating a case where an existing weld bead 29A has a small base angle $\theta$, and FIG. 2B is a schematic cross-sectional view illustrating a case where the existing weld bead 29A has a large base angle $\theta$.

As illustrated in FIG. 2A, if the base angle $\theta$ of the existing weld bead 29A is small, when an adjacent weld bead 29B is formed by overlapping the existing weld bead 29A, an occurrence rate of defects between the weld beads 29A and 29B is low. On the other hand, as illustrated in FIG. 2B, if the base angle $\theta$ of the existing weld bead 29A is large, when the adjacent weld bead 29B is formed by overlapping the existing weld bead 29A, molten metal does not sufficiently flow to a base of the existing weld bead 29A, and thus the occurrence rate of defects between the weld beads 29A and 29B increases. For example, when the base angle θ of the existing weld bead 29A is 40° or more, the occurrence rate of defects due to poor fusion between the weld beads 29A and 29B increases.

The occurrence rate of defects in the overlapping portion between adjacent weld beads 29 varies depending on the base angle θ of the existing weld bead 29A as well as welding conditions such as a welding voltage, a welding current, a feed rate of the filler material M, a feed resistance of the filler material M, a shielding gas flow rate, and a molten pool flow status when forming the weld bead 29.

Therefore, the manufacturing system 100 according to the present embodiment includes an additive-manufacturing process monitoring device that estimates defects in the adjacent weld beads 29A and 29B as described above.

The additive-manufacturing process monitoring device extracts defect candidates based on a measurement result from the shape sensor (shape profile acquiring unit) 25 disposed side by side with the torch 23 and welding information, which is welding state information such as the welding voltage, the welding current, the feed rate of the filler material M, and the molten pool flow status when forming the weld bead 29. The control unit 21 includes a welding information acquisition unit and a defect candidate extraction unit. The welding information acquisition unit acquires welding information, and the defect candidate extraction unit extracts defect candidates. Then, process information including the defect candidate is stored in the database 17.

Next, extraction of defect candidates by the additive-manufacturing process monitoring device will be described. Here, a case will be described in which the welding voltage for forming the weld bead 29B adjacent to the existing weld bead 29A is used as the welding information.

Shape Profile Acquisition Process

Figure 3:
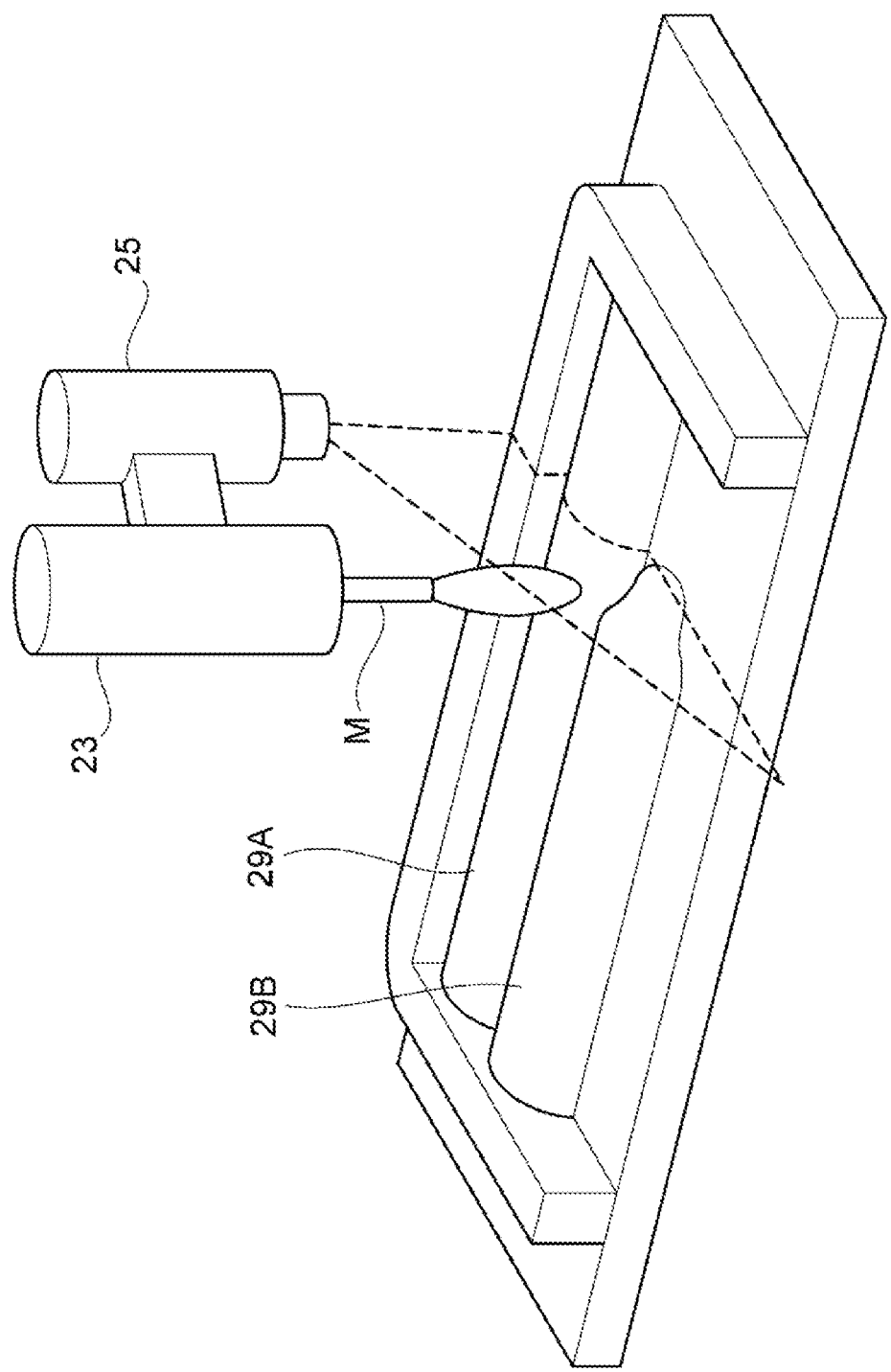
FIG. 3 is a perspective view illustrating how a weld bead adjacent to an existing weld bead is formed.

FIG. 3 is a perspective view illustrating how the weld bead 29B adjacent to the existing weld bead 29A is formed.

As illustrated in FIG. 3, the weld bead 29B is formed while moving the torch 23 at a position adjacent to the existing weld bead 29A. Here, the shape of the existing weld bead 29A is measured by the shape sensor 25 in front of the torch 23, and the shape profile along an extending direction of the weld bead 29A is acquired.

Welding Information Acquisition Process

When the weld bead 29B is formed adjacent to the existing weld bead 29A, the welding information acquisition unit of the control unit 21 acquires the welding voltage during the formation of the weld bead 29B as welding information. The welding information acquisition unit of the control unit 21 monitors and acquires output of the welding power source 19, for example.

Defect Candidate Extraction Process

Defect candidates are extracted by the defect candidate extraction unit of the control unit 21.

Specifically, first, based on the shape profile of the existing weld bead 29A acquired by the shape sensor 25, the base angle θ on an open side of the existing weld bead 29A is determined, and a portion where the base angle θ is equal to or larger than a preset threshold is determined as an angle characteristic portion Rc. The threshold of the base angle θ is, for example, 40° at which defects are likely to occur.

Next, based on the welding information composed of the welding voltage acquired during the formation of the weld bead 29B to be formed at an adjacent position, a welding characteristic portion Wc of the welding information is determined. The welding characteristic portion Wc is a portion where the welding voltage fluctuates greatly. For example, abnormal disturbances in a welding voltage waveform can cause arc disturbances or interruptions, which can adversely affect fluidity of the molten metal. Therefore, by setting a threshold for an instantaneous fluctuation value, a gradient of fluctuation, or the like based on the past abnormal waveform, a state with a high probability of occurrence of a defect is extracted as the welding characteristic portion Wc.

Then, the determined angle characteristic portion Rc and the welding characteristic portion Wc are compared, and the welding characteristic portion Wc corresponding to the angle characteristic portion Rc is extracted as a defect candidate F in association with the angle characteristic portion Rc.

As the process information to be acquired for extracting defect candidate F, for example, information in which coordinates X, Y, Z, the base angle θ, and the welding voltage V are associated with each other and recorded over time (for each position) is used when the weld bead 29B is formed.

Figure 4:
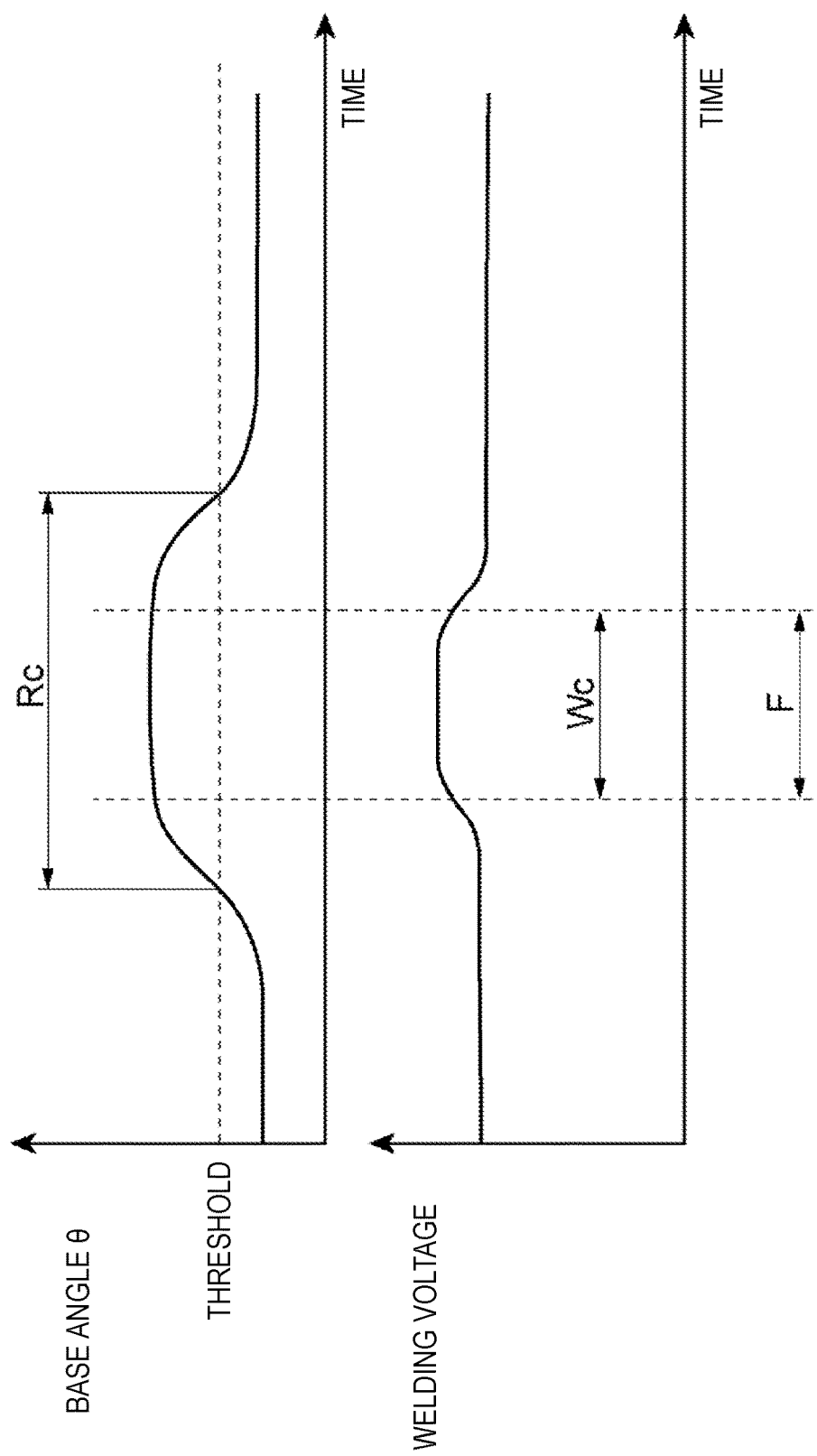
FIG. 4 is an explanatory view schematically illustrating the base angle of the existing weld bead and a welding voltage profile of the adjacent weld bead.

FIG. 4 is an explanatory view schematically illustrating the base angle θ of the existing weld bead 29A and a welding voltage profile of the adjacent weld bead 29B.

As illustrated in FIG. 4, the defect candidate extraction unit of the control unit 21 sets, as the angle characteristic portion Rc, a portion in which the base angle θ of the existing weld bead 29A is equal to or greater than the threshold, and further the defect candidate extraction unit sets, as the welding characteristic portion Wc, a portion in which the welding voltage of the adjacent weld bead 29B fluctuates from steady transition. Then, the part where the welding characteristic portion Wc is generated in the angle characteristic portion Rc is extracted as the defect candidate F, and process information (information for each position in which the coordinates X, Y, Z, the base angle θ, and the welding voltage V are associated with each other) including the defect candidate F is stored in the database 17.

As described above, according to the additive-manufacturing process monitoring device and additive-manufacturing process monitoring method according to the present embodiment, by setting, as the defect candidate F, the case where the welding information of the adjacent weld bead 29B at the position corresponding to the angle characteristic portion Rc at which the base angle θ of the existing weld bead 29A is equal to or greater than the threshold has a characteristic, a highly reliable defect candidate F can be extracted.

Then, according to the additively manufactured object manufacturing system 100 equipped with the additive-manufacturing process monitoring device, when the additively manufactured object W is being built, it is possible to easily ascertain possible defect locations in the additively manufactured object W. As a result, after the additively manufactured object W is built, the defect locations of the additively manufactured object W can be quickly repaired.

The defect candidate extraction unit of the control unit 21 preferably performs an occurrence frequency calculation process for calculating an occurrence frequency of the defect candidates F in the defect candidate extraction process. By calculating the occurrence frequency of the defect candidates F as such, it is possible to estimate locations in the additively manufactured object W that should be precisely inspected based on the occurrence frequency of the defect candidates F. The occurrence frequency of the defect candidates F can be calculated using, as an index, the number of occurrences during formation of one weld bead 29, the duration of occurrence of the defect candidate, or the like. Referring to trajectory planning information, the cases may be divided into groups such as when building a wall portion, when filling an inside of the wall portion, and when forming an overhang portion, and the occurrence frequency of the defect candidates F may be calculated in each group.

Preferably, the defect candidate extraction unit of the control unit 21 estimates a defect size in the additively manufactured object W from an occurrence time of the defect candidate F and a moving speed of the torch 23 based on the occurrence frequency of the defect candidates F in the defect candidate extraction process. By estimating the defect size in the additively manufactured object W as such, defects occurring in the additively manufactured object W can be easily grasped without performing complicated inspections such as destructive inspection or ultrasonic inspection. When the occurrence frequency of the defect candidates F continues for a certain length, it can be estimated that a long and narrow defect has occurred. When the occurrence frequency of the defect candidate F is extremely short, it can be estimated that the defect candidate has occurred due to a minute defect or noise. Therefore, when the occurrence frequency of this defect candidates F is equal to or greater than a preset threshold, process information including that defect candidate F may be stored as defect information.

In the above-described embodiment, the welding voltage is used as the welding information to determine the welding characteristic portion Wc, but the welding information is not limited to the welding voltage. As welding information, at least one of the welding voltage, the welding current, the feed rate of the filler material M, the feed resistance of the filler material M, the flow rate of the shielding gas, and the flow status of the molten pool may be used. The welding voltage, welding current, feed rate of the filler material M, and the flow status of the molten pool may be used in combination.

Here, a case where the flow status of the molten pool is used as the welding information will be described.

Figure 5:
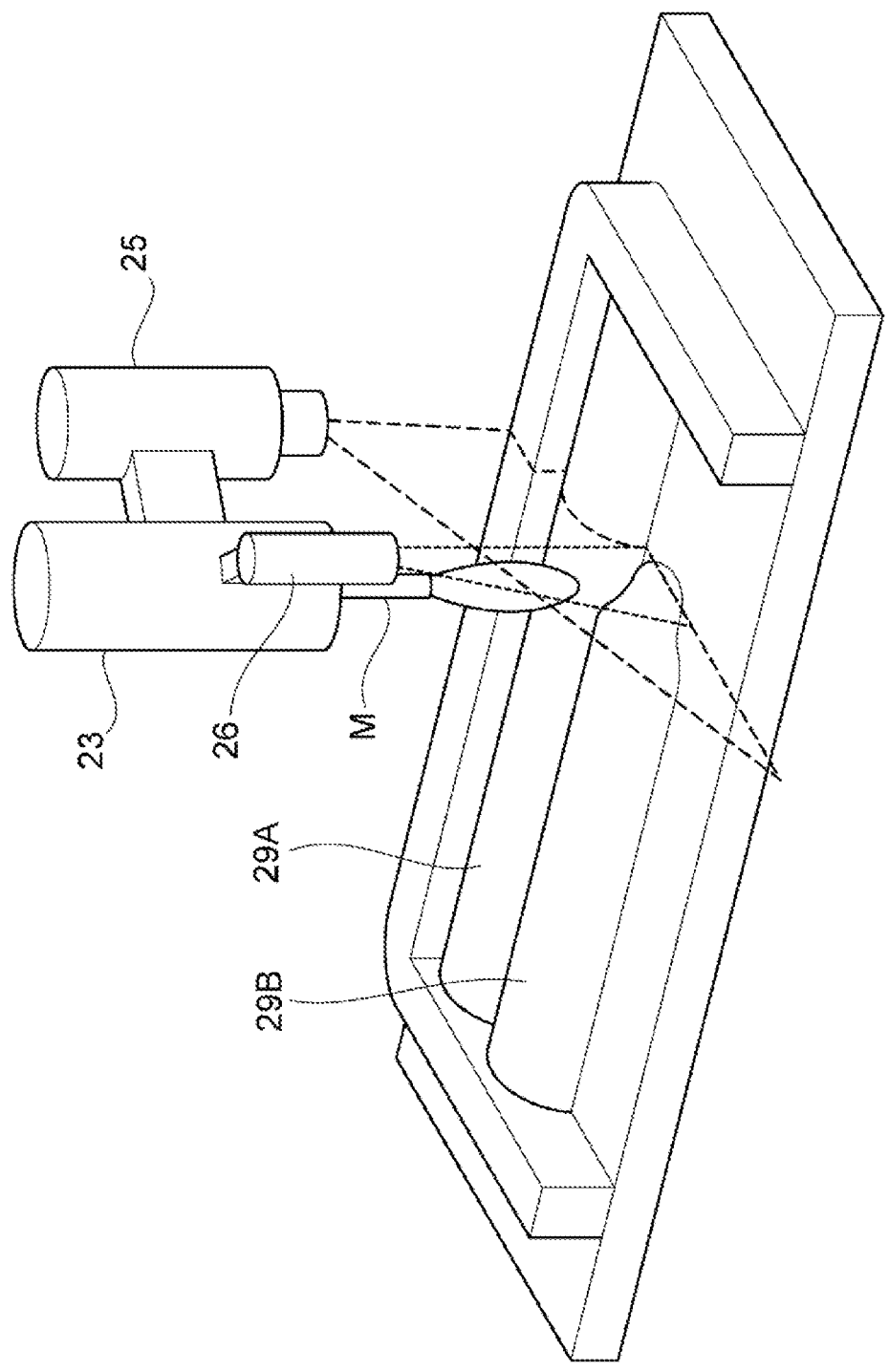
FIG. 5 is a perspective view illustrating how a weld bead is formed along an existing weld bead.

FIG. 5 is a perspective view illustrating how the weld bead 29B is formed along the existing weld bead 29A.

As illustrated in FIG. 5, when the flow status of the molten pool is used as the welding information, a camera 26 for photographing a portion of a molten pool P is disposed side by side with the shape sensor 25 on the torch 23.

Then, when forming the weld bead 29B at a position adjacent to the existing weld bead 29A, the shape sensor 25 measures the shape of the existing weld bead 29A, and the camera 26 photographs the molten pool P of the weld bead 29B, and then the photographed data is acquired as the welding information. Then, based on the welding information made up of the photographed data, for example, a portion where the shape of the molten pool P greatly fluctuates is determined as the welding characteristic portion Wc. The data of an area of the molten pool P may be used as the photographed data.

Figure 6:
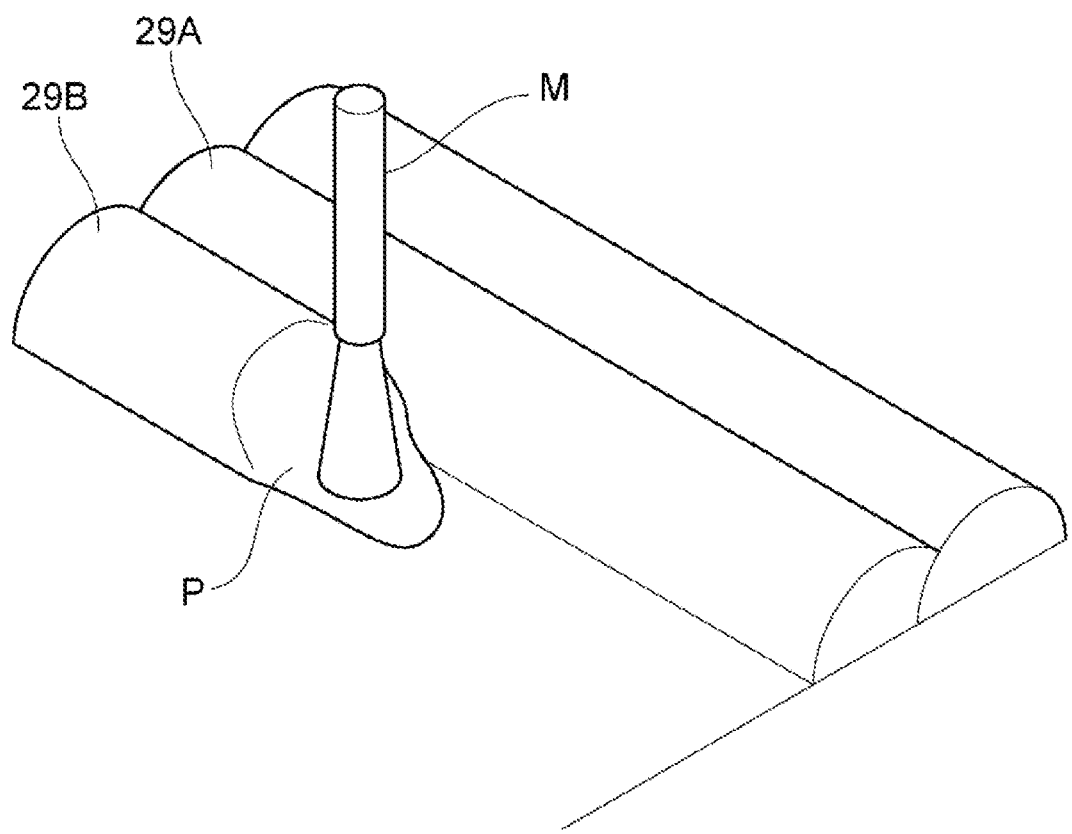
FIG. 6 is a perspective view illustrating a molten pool formed on a weld bead.
Figure 7A:
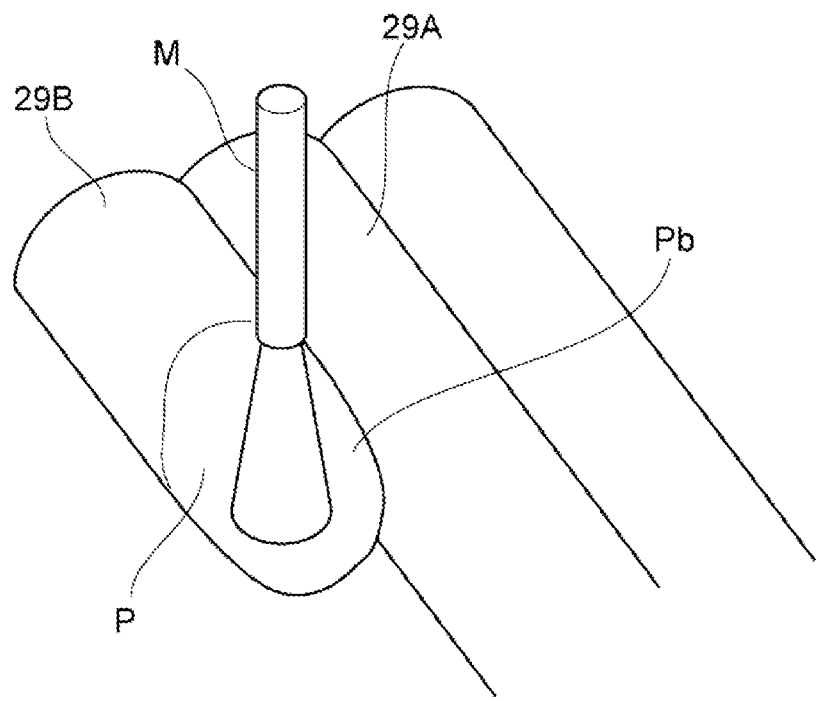
FIGS. 7A and 7B are diagrams for illustrating variations in a shape of the molten pool, where
Figure 7B:
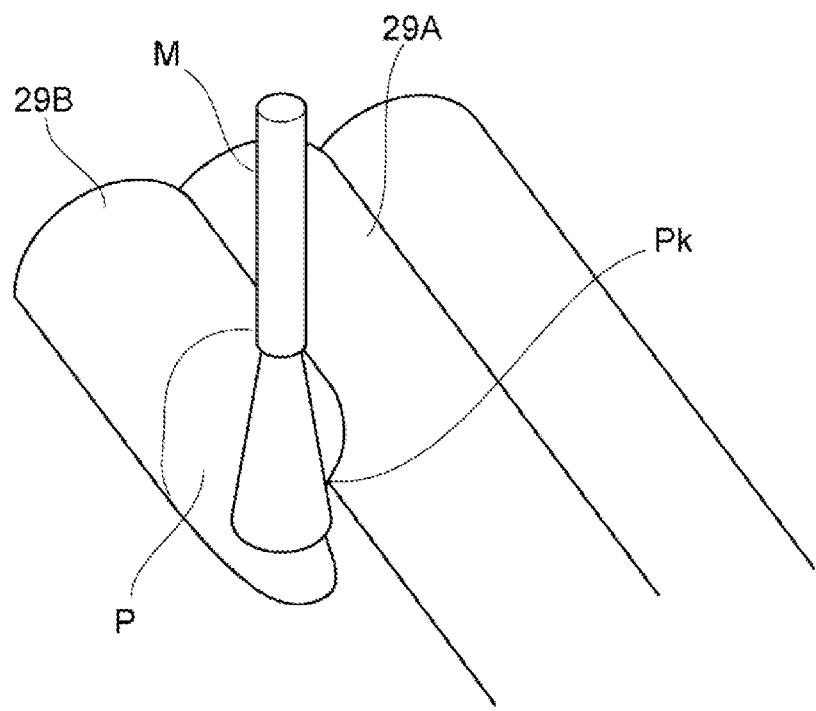

FIG. 6 is a perspective view illustrating the molten pool P formed on the weld bead 29B. FIGS. 7A and 7B are diagrams for illustrating variations in the shape of the molten pool P, where FIG. 7A is a perspective view of a state in which a bulging portion Pb is formed, and FIG. 7B is a perspective view of a state in which a recessed portion Pk is formed.

FIG. 6 illustrates the molten pool P of normal shape. The molten pool P may vary greatly from the normal shape illustrated in FIG. 6. For example, as illustrated in FIG. 7A, the molten pool P may partially swell to form the bulging portion Pb. As illustrated in FIG. 7B, the molten pool P may be partially recessed to form the recessed portion Pk. Then, the welding information acquisition unit of the control unit 21 determines a portion where the shape of the molten pool P is changed in the weld bead 29B and the bulging portion Pb and the recessed portion Pk are generated as the welding characteristic portion Wc.

The defect candidate extraction unit of the control unit 21 compares the angle characteristic portion Rc determined based on the shape profile of the existing weld bead 29A acquired by the shape sensor 25 and the welding characteristic portion Wc determined based on the welding information consisting of the photographed data of the camera 26. Then, the defect candidate extraction unit associates the welding characteristic portion Wc corresponding to the angle characteristic portion Rc with the angle characteristic portion Rc and extracts the associated portions as the defect candidate F.

As such, even when the flow status of the molten pool P is used as the welding information, by associating the welding characteristic portion Wc in the acquired welding information of the flow status of the molten pool P with the angle characteristic portion Rc and making the associated portions the defect candidate F, a highly reliable defect candidate can be extracted.

The flow status of the molten pool P may be the status such as temperature and brightness. Here, a temperature sensor for detecting the temperature of the molten pool P, a brightness sensor for detecting the brightness of the molten pool P, and the like are disposed side by side on the torch 23.

Thus, the present invention is not limited to the above-described embodiment, and combinations of the configurations of the embodiment with each other, and modifications and applications by those skilled in the art based on the descriptions in the specification and well-known techniques are also contemplated by the present invention, and are included in the scope of protection.

As described above, the specification discloses the following matters.

(1) An additive-manufacturing process monitoring device that estimates a defect from process information when building an additively manufactured object by forming a plurality of weld beads in which a filler material is melted and solidified by a torch, the additive-manufacturing process monitoring device including:

a shape profile acquisition unit for acquiring a shape profile along an extension direction of an existing weld bead;

a welding information acquisition unit for acquiring welding information during formation of an adjacent weld bead when forming the adjacent weld bead at a position adjacent to the existing weld bead; and a defect candidate extraction unit for determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

According to the additive-manufacturing process monitoring device, the welding characteristic portion corresponding to the angle characteristic portion where the base angle of the existing weld bead is equal to or greater than the threshold is associated and extracted as the defect candidate. When the weld bead adjacent to the existing weld bead is formed, if the base angle of the existing weld bead is large, there is a high risk of defects due to lack of fluidity.

Therefore, it is possible to extract a highly reliable defect candidate by taking as the defect candidate a case where the welding information of the adjacent weld bead at the position corresponding to the angle characteristic portion where the base angle of the existing weld bead is equal to or greater than the threshold is characteristic.

(2) The additive-manufacturing process monitoring device according to (1), where
the welding information acquisition unit acquires at least one of a welding voltage, a welding current, a feed rate of the filler material, a feed resistance of the filler material, a shielding gas flow rate, and a flow status of a molten pool as the welding information.

According to the additive-manufacturing process monitoring device, by associating the welding characteristic portion in at least one piece of welding information of the acquired welding voltage, welding current, feed rate of the filler material, and molten pool flow status with the angle characteristic portion and taking the associated portions as the defect candidate, a highly reliable defect candidate can be extracted.

(3) The additive-manufacturing process monitoring device according to (1) or (2), where
the defect candidate extraction unit performs an occurrence frequency calculation process for calculating an occurrence frequency of the defect candidates.

According to the additive-manufacturing process monitoring device, by calculating the occurrence frequency of the defect candidates, it is possible to estimate a location to be inspected precisely in the additively manufactured object based on the occurrence frequency.

(4) The additive-manufacturing process monitoring device according to (3), where
the defect candidate extraction unit estimates a defect size in the additively manufactured object based on the occurrence frequency of the defect candidates.

According to the additive-manufacturing process monitoring device, defects occurring in the additively manufactured object can be easily grasped based on the defect size estimated from the occurrence frequency of the defect candidates without performing complicated inspection such as destructive inspection or ultrasonic inspection. When the occurrence frequency of the defect candidates continues for a certain length, it can be estimated that a long and narrow defect has occurred. When the occurrence frequency of the defect candidates is extremely short, it can be estimated that the defect candidate has occurred due to the influence of noise or a minute defect.

(5) An additively manufactured object manufacturing system that builds an additively manufactured object by forming a weld bead in which a filler material is melted and solidified by a torch while moving the torch, the additively manufactured object manufacturing system including:
the additive-manufacturing process monitoring device according to any one of (1) to (4).

According to the additively manufactured object manufacturing system, when the additively manufactured object is built, it is possible to easily grasp a defect location that may occur in the additively manufactured object. As a result, the defect location of the additively manufactured object can be quickly repaired after the building of the additively manufactured object.

(6) An additive-manufacturing process monitoring method that estimates a defect from process information when building an additively manufactured object by forming a plurality of weld beads in which a filler material is melted and solidified by a torch, the additive-manufacturing process monitoring method including the steps of:
acquiring a shape profile along an extension direction of an existing weld bead;
acquiring welding information during formation of an adjacent weld bead when forming the adjacent weld bead at a position adjacent to the existing weld bead; and
determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

According to the additive-manufacturing process monitoring method, the welding characteristic portion corresponding to the angle characteristic portion in which the base angle of the existing weld bead is equal to or greater than the threshold is associated and extracted as the defect candidate. When a weld bead adjacent to the existing weld bead is formed, if the base angle of the existing weld bead is large, there is a high risk of a defect due to lack of fluidity. Therefore, it is possible to extract a highly reliable defect candidate by taking as the defect candidate a case where the welding information of the adjacent weld bead at the position corresponding to the angle characteristic portion where the base angle of the existing weld bead is equal to or greater than the threshold is characteristic.

(7) The additive-manufacturing process monitoring method according to (6), where
in the step of acquiring welding information, at least one of a welding voltage, a welding current, a feed rate of the filler material, a feed resistance of the filler material, a shielding gas flow rate, and a flow status of a molten pool is acquired as the welding information.

According to the additive-manufacturing process monitoring method, by associating the welding characteristic portion in at least one piece of welding information of the acquired welding voltage, welding current, feed rate of the filler material, and molten pool flow status with the angle characteristic portion and taking the associated portions as the defect candidate, a highly reliable defect candidate can be extracted.

(8) The additive-manufacturing process monitoring method according to (6) or (7), where
in the step of extracting defect candidate, an occurrence frequency calculation process for calculating an occurrence frequency of the defect candidates is performed.

According to the additive-manufacturing process monitoring method, by calculating the frequency of occurrence of defect candidates, it is possible to estimate a location to be inspected precisely in the additively manufactured object based on the occurrence frequency.

(9) The additive-manufacturing process monitoring method according to (8), where
in the step of extracting defect candidate, a defect size in the additively manufactured object is estimates based on the occurrence frequency of the defect candidates.

According to the additive-manufacturing process monitoring method, defects occurring in the additively manufactured object can be easily grasped based on the defect size estimated from the occurrence frequency of the defect candidates without performing complicated inspection such as destructive inspection or ultrasonic inspection. When the occurrence frequency of the defect candidates continues for a certain length, it can be estimated that a long and narrow defect has occurred. When the occurrence frequency of the defect candidates is extremely short, it can be estimated that the defect candidate has occurred due to the influence of noise or a minute defect.

The application is based on a Japanese patent application (Japanese Patent Application No. 2021-13390) filed on Jan. 29, 2021, the content of which is incorporated herein by reference.

REFERENCE SIGNS LIST

21: control unit (welding information acquisition unit, defect candidate extraction unit)
23: torch
25: shape sensor (shape profile acquisition unit)
29, 29A, 29B: weld bead
100: manufacturing system (additive-manufacturing process monitoring device)
M: filler material
F: defect candidate
P: molten pool
W: additively manufactured object
Rc: angle characteristic portion
Wc: welding characteristic portion
θ: base angle

The invention claimed is:

1. An additive-manufacturing process monitoring device that estimates a defect from process information when building an additively manufactured object by forming a plurality of weld beads in which a filler material is melted and solidified by a torch, the additive-manufacturing process monitoring device comprising:
   a shape profile acquisition unit for acquiring a shape profile along an extension direction of an existing weld bead;
   a welding information acquisition unit for acquiring welding information during formation of an adjacent weld bead when forming the adjacent weld bead at a position adjacent to the existing weld bead; and
   a defect candidate extraction unit for determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

2. The additive-manufacturing process monitoring device according to claim 1, wherein
   the welding information acquisition unit acquires at least one of a welding voltage, a welding current, a feed rate of the filler material, a feed resistance of the filler material, a shielding gas flow rate, and a flow status of a molten pool as the welding information.

3. The additive-manufacturing process monitoring device according to claim 2, wherein
   the defect candidate extraction unit performs an occurrence frequency calculation process for calculating an occurrence frequency of defect candidates.

4. The additive-manufacturing process monitoring device according to claim 3, wherein
   the defect candidate extraction unit estimates a defect size in the additively manufactured object based on the occurrence frequency of the defect candidates.

5. The additive-manufacturing process monitoring device according to claim 1, wherein
   the defect candidate extraction unit performs an occurrence frequency calculation process for calculating an occurrence frequency of defect candidates.

6. The additive-manufacturing process monitoring device according to claim 5,
   wherein the defect candidate extraction unit estimates a defect size in the additively manufactured object based on the occurrence frequency of the defect candidates.

7. An additively manufactured object manufacturing system that builds an additively manufactured object by forming a weld bead in which a filler material is melted and solidified by a torch while moving the torch, the additively manufactured object manufacturing system comprising:
   the additive-manufacturing process monitoring device according to claim 1.

8. An additive-manufacturing process monitoring method that estimates a defect from process information when building an additively manufactured object by forming a plurality of weld beads in which a filler material is melted and solidified by a torch, the additive-manufacturing process monitoring method comprising:
   acquiring a shape profile along an extension direction of an existing weld bead;
   acquiring welding information during formation of an adjacent weld bead when forming the adjacent weld bead at a position adjacent to the existing weld bead; and
   determining an angle characteristic portion having a base angle equal to or greater than a threshold in the existing weld bead based on the shape profile, determining a welding characteristic portion of the welding information based on the welding information, and extracting the welding characteristic portion corresponding to the angle characteristic portion as a defect candidate by associating the welding characteristic portion with the angle characteristic portion.

9. The additive-manufacturing process monitoring method according to claim 8, wherein
   in the acquiring of the welding information, at least one of a welding voltage, a welding current, a feed rate of the filler material, a feed resistance of the filler material, a shielding gas flow rate, and a flow status of a molten pool is acquired as the welding information.

10. The additive-manufacturing process monitoring method according to claim 8, wherein
    in the extracting of the defect candidate, an occurrence frequency calculation process for calculating an occurrence frequency of defect candidates is performed.

11. The additive-manufacturing process monitoring method according to claim 10, wherein
    in the extracting of the defect candidate, a defect size in the additively manufactured object is estimated based on the occurrence frequency of the defect candidates.

* * * * *